United States Patent
Asa et al.

(10) Patent No.: US 7,636,299 B2
(45) Date of Patent: Dec. 22, 2009

(54) PACKET REPEATER

(75) Inventors: Akihiro Asa, Kawasaki (JP); Kenichi Kawarai, Yokohama (JP); Hideji Abe, Kawasaki (JP); Osamu Tsurumi, Kawasaki (JP); Hiroyuki Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 11/235,576

(22) Filed: Sep. 27, 2005

(65) Prior Publication Data

US 2006/0215544 A1 Sep. 28, 2006

(30) Foreign Application Priority Data

Mar. 22, 2005 (JP) ............... 2005-081320

(51) Int. Cl.
G01R 31/08 (2006.01)
H04L 12/56 (2006.01)

(52) U.S. Cl. .............. 370/216; 370/226; 370/246; 370/252; 370/392; 370/401

(58) Field of Classification Search ........... 370/216, 370/225, 226, 227, 242, 246, 252, 392, 401
See application file for complete search history.

(56) References Cited

U.S. PATENT DOCUMENTS 5,265,092 A * 11/1993 Soloway et al. ............ 370/238
6,704,283 B1 * 3/2004 Stiller et al. ............... 370/238
6,766,482 B1 * 7/2004 Yip et al. ................... 714/717
2001/0048660 A1 * 12/2001 Saleh et al. ................ 370/216
2002/0060986 A1 * 5/2002 Fukushima et al. ........ 370/218
2002/0150039 A1 * 10/2002 Valdevit .................... 370/216

FOREIGN PATENT DOCUMENTS

JP 2003-234747 8/2003

* cited by examiner

*Primary Examiner*—Steven H Nguyen
(74) *Attorney, Agent, or Firm*—Staas & Halsey LLP

(57) ABSTRACT

A repeater and method provides a technique to minimize congestion and packet loss, which may be generated when a fault is detected in a ring type packet network or when the network recovers from such a fault. A repeater having a plurality of ports for transmitting and receiving packets in a ring type network for transmitting the received packets on the basis of an address included in a received packet and a transmitting port database indicating an identifier of a port to transmit the packet having the address as the destination, comprises a control packet processing block to detect reception of a fault notifying packet transmitted from a repeater having detected a fault and a control block to update, upon reception of the fault notifying packet from an immediately adjacent repeater, a port identifier of the transmitting port database having a port identifier of the port having received said fault notifying packet into a port identifier of a port connected to another immediately adjacent repeater.

7 Claims, 14 Drawing Sheets

Fig. 6

| ADDRESS | PORT | NUMBER OF HOPS |
|---------|------|----------------|
| X | P3 | 0 |
| Y | P1 | 1 |
| Z | P1 | 2 |
| U | P1 | 3 |
| V | P1 | 4 |
| W | P1 | 5 |

Fig. 8

(a) NODE A

| ADDRESS | PORT | NUMBER OF HOPS |
|---|---|---|
| X | P3 | 0 |
| Y | P1 | 1 |
| Z | P1 | 2 |
| U | P1 | 3 |
| V | P1 | 4 |
| W | P1 | 5 |

(b) NODE B

| ADDRESS | PORT | NUMBER OF HOPS |
|---|---|---|
| X | P2 | 1 |
| Y | P3 | 0 |
| Z | P1 | 1 |
| U | P1 | 2 |
| V | P1 | 3 |
| W | P1 | 4 |

(c) NODE C

| ADDRESS | PORT | NUMBER OF HOPS |
|---|---|---|
| X | P2 | 2 |
| Y | P2 | 1 |
| Z | P3 | 0 |
| U | P1 | 1 |
| V | P1 | 2 |
| W | P1 | 3 |

(d) NODE D

| ADDRESS | PORT | NUMBER OF HOPS |
|---|---|---|
| X | P2 | 3 |
| Y | P2 | 2 |
| Z | P2 | 1 |
| U | P3 | 0 |
| V | P1 | 1 |
| W | P1 | 2 |

(e) NODE E

| ADDRESS | PORT | NUMBER OF HOPS |
|---|---|---|
| X | P2 | 4 |
| Y | P2 | 3 |
| Z | P2 | 2 |
| U | P2 | 1 |
| V | P3 | 0 |
| W | P1 | 1 |

(f) NODE F

| ADDRESS | PORT | NUMBER OF HOPS |
|---|---|---|
| X | P2 | 5 |
| Y | P2 | 4 |
| Z | P2 | 3 |
| U | P2 | 2 |
| V | P2 | 1 |
| W | P3 | 0 |

PACKET REPEATER

BACKGROUND OF THE INVENTION

1. Field of the Invention

The present invention relates to a packet transmitting technique and particularly to a packet network including a ring type topology, a packet repeater forming this network, and a packet repeating method.

2. Description of the Related Art

At present, in the wide area ETHERNET® services which are served by the communication companies (so-called type 1 carrier) having their own fundamental facilities required for providing the services, a network is constituted in the form in which many layer 2 switch devices (hereinafter referred to as L2SW devices) are connected as the exchange nodes and various topologies are also used in accordance with application modes.

In order to determine the topology of the network to be constituted, reliability and cost of the network as a whole are very important elements. Particularly, a ring type network is somewhat inferior to a mesh type network but is often employed because reliability is rather high and economical merit can be attained with fewer requirements, such as transmission links, among the nodes forming the network and transmission link interfaces of nodes.

In the ring type network, the reliability thereof is guaranteed with its redundancy function with which the communications can be continued by changing the transfer route of the frames (packets) even if a fault occurs in a part of the transmission links forming the ring.

However, if only the L2SW devices are connected like a ring, a loop is formed in the route for transmission of the data frames (MAC frames). In the case where the MAC frame which has been input to the L2SW device under this condition is the broadcast frame, this frame is increased up to a plurality of frames each time when the frame passes the node. Thereby, traffic congestion that may be termed a broadcast storm occurs each time when this frame circulates the loop. Finally, as a result, the normal data traffic on the ring may be interfered with and the network is likely to cease operation.

Accordingly, a certain means will be required in order to avoid formation of a loop path when the L2SW devices are connected like a ring. Moreover, a highly reliable network cannot be attained if it is impossible that the route can be altered to maintain data traffic by detouring a fault generating location and quickly restart communications, when a fault such as breakdown of a link is generated among the nodes in the ring network.

As explained above, various problems are still left unsolved in the ring type network. For example, sufficient consideration must be taken for loop path, switching of route when a fault occurs, and influence on data traffic which is not related directly to the fault.

Next, the existing ring redundant system in the ETHERNET® will be explained.

The redundant system in relation to reliability of network has been discussed mainly aimed at a system based on the ring type network in each transmission system of SONET (Synchronous Optical NETwork) or SDH (Synchronous Digital Hierarchy) and a system based on a star type network in ETHERNET®.

However, the following system is known as the ring redundant system in ordinary ETHERNET® service. This system has been individually developed by a vendor as the function just suitable for wide area ETHERNET® for communication companies that are requesting to form a ring type network with ETHERNET®, which can be realized at a low cost.

FIG. 13 is a diagram for explaining the redundant system of the existing ring type network.

In FIG. 13, node A71 to node F76 as the L2SW devices form a ring type network using the transmission links 21 to 26 respectively. Node A71 and node B72 are connected with transmission link 21 between port P1 of node A71 and port P2 of node B72. Here, the port and the transmission link are constituted to enable two-way communications.

Moreover, port P3 of each node is connected respectively with terminals 31 to 36, which are assumed to have MAC addresses of X, Y, Z, U, V, and W. Only one port P3 is shown, as the port for connection of the terminal of each node, to each node, for simplicity of the drawing. However, in general, a plurality of terminal's connection ports are also provided for connecting a plurality of terminals.

In this structure, one of nodes A71 to F76 is designated as a master node. In FIG. 13, node A71 is designated as the master node. This master node is manually set by a network administrator. One of the two ports P1, P2 belonging to the ring transmission link is called the primary port and the other, the secondary port. In the example of FIG. 13, port P1 of node A71 is the primary port and port P2 is the secondary port.

The nodes B72 to F76 on the ring other than the master node are called the transit nodes and the ports P1, P2 belonging to the ring are usually in the forwarding state.

The master node transmits health check packets to the ring at an interval of several seconds from its own primary port and the transit node sequentially transfers the received health check packets to the neighboring nodes. The master node recognizes that the ring is in the normal state when the health check packets are received by the secondary port of the master node after making a turn through the ring.

Moreover, the secondary port of the master node is usually capable of receiving only the health check packets in order to prevent the MAC frame from being maintained in the closed loop state having no exit and being in the locking state not receiving any other data traffic. Operation under the normal state of the ring has been explained above.

FIG. 14 is a diagram (No. 2) for explaining the redundant system of the existing ring type network.

Operation when a fault is generated will be explained below, considering an example where a link fault is generated due to breakdown or the like of the transmission link between node C73 and node D74 as illustrated in FIG. 14.

If a link fault is generated, the health check packet transmitted from the master node A71 cannot make a turn through the ring transmission link and cannot return to the master node A71 itself. Moreover, node C73, node D74 having detected the link fault, transmits the fault notifying packet (trap packet) to the master node from the port in the opposite side of the port having detected the fault. In the example of FIG. 14, node C73 transmits the fault notifying packet from port P2, while node D74, from port P1.

The master node A71 changes, upon reception of the fault notifying packet at the primary port P1 or secondary port P2 thereof, the secondary port which has been in the blocking state to the forwarding state. Thereby, the communication link up to node D74 from node C73 is acquired through the master node A71, enabling communications among all nodes.

However, in this timing, since the frames transferred on the ring are switched in accordance with the FDB (Forwarding Data Base) which has been held by each node before generation of a fault, the frames passing node C73 to node D74 before generation of a fault are transferred directly toward the fault generating section and are finally lost as a result. Namely, communication ceases until the FDB of the node is cleared.

In order to avoid such an event, master node A71 transmits the FDB flash packet instructing clearing of the FDB held by the node to all transit nodes immediately after the secondary port P2 is set to the forwarding state. Accordingly, a new communication link can be learned to enable communications by once clearing the FDB holding the transit nodes on the ring.

Operation, when a fault is restored by a maintenance person, of the network will be explained below considering an example in which a link fault between node C73 and node D74 in the fault generating section has been recovered to the normal state.

Owing to recovery of a fault, the health check packet from master node A71 can be transmitted through node C73 to node D74. Therefore, master node A71 can receive the health check packet with its own secondary port P2 and then recognize that the ring has returned to the normal state. Subsequently, master node A71 changes secondary port P2 to the blocking state from the forwarding state. Accordingly, the communication link between node A71 and node F76 enters the communication blocking state, requesting the clearing of the FDB in each transit node with the same reason explained above.

Moreover, the master node A71 transmits the packets to all transit nodes in order to notify that port P2 is in the blocking state to the transit state and to instruct clear of the FDB itself.

With the operations explained above, reliability of the ring type network can be enhanced in the redundant system. However, in this redundant system, since the master node exists within the ring just as it is fixed and all operations are performed with a certain control packet from the master node, a problem also arises. For example, the communication cease time becomes longer as the number of nodes forming the ring type network increases.

A technique for quickly switching the rings with which the nodes forming the duplicated ring type networks transmit and receive packets using the remaining time of the health check packets in order to avoid a fault in the transmission link or the like has also been disclosed (for example, refer to patent document JP-A No. 2003-234747

The redundant system of the related art explained above has the following problems.

Namely, in the redundant system of the related art, the node which has detected a fault such as link-off or the like transmits the fault notifying packet to the master node during the period until communication has recovered from occurrence of a fault and the master node having received such a packet transitions its own secondary port to the forwarding state from the blocking state and transmits the FDB flash packet to the transit nodes forming the ring type network.

Each transit node having received this FDB flash packet learns again the transfer link of the frames to be transferred by clearing the FDB being held. Accordingly, the transfer link of the frame is changed and communication is started again.

As explained above, the procedures of many stages are required until communication can be started again and therefore the communication cease time becomes longer when the procedures increase. Moreover, the FDB of each node must be cleared to change the transfer link of the frames, but if the FDBs of all nodes on the ring are cleared at one time, a large amount flooding is generated momentarily.

Such flooding is generated by the following operations of each node having cleared the FDB.

For example, in FIG. 13, when terminal 31 transmits data to terminal 36, the frame transmitted by terminal 31 includes X as the transmitting source address (SA) and W as the destination address (DA).

Node A71 having received this frame from port P3 registers first the SA:X and port P3 to the FDB under the corresponding state. Moreover, in order to determine the port for transmitting this frame, the FDB is searched using the DA as the search key and when such FDB is hit, this frame is transferred to the corresponding port.

If any FDB is not hit, this frame is transferred to all ports (port P1, P2) other than the port having received this frame (in this case, port P3).

Because of the flooding of node A71, each node receives this frame.

Each node registers, as explained above, the SA:X and the received port to the FDB under the corresponding state. Moreover, in order to determine the port for transmitting this frame, the FDB is searched using the DA as the search key. When a certain FDB is hit, this frame is transferred to the corresponding port.

If any FDB is not hit, this frame is transferred to all ports other than the port having received this frame. Here, it is assumed that the FDB of node F76 connected with the terminal 36 of the DA:W is not hit. This means that there is no entry having the address W in the FDB because the FDB is cleared or the frame that has the SA:W is not received for a certain period.

In this case, node B72 receives this frame from port P2, for example, and transfers it to ports P1, P3. Moreover, node F76 receives this frame from port P2 and transfers it to ports P1, P3. The frame transmitted from port P3 of node F76 is received by terminal 36 because the DA is the address thereof.

With a series of these operations, entry of the address X is registered to the FDB of each node and the port corresponding to this address respectively becomes node A71: P3, node B72: P2, node C73: P2, node D74: P2, node E75: P2, node F76: P2. This operation is considered as that the FDB learns the MAC address.

When terminal 36 connects, for example, node F76 transmits, under this state, the frame of DA:X to terminal 31, node F76 having received this frame searches the FDB using the X as the search key and obtains the corresponding port P2 and transfers this frame to this port P2. In the same manner, the frame is transferred among the nodes and when this frame is received with port P1 of node A71, the frame is output to port 3 corresponding to address X with the search of the FDB and then transferred to terminal 31. Simultaneously when this frame is transferred, the FDB of each node learns, with a series of transfer processes, correspondence between the address W of terminal W36 as the transmitting source and the port having received the frame and generates entry of address W.

As explained above, when entry is not included in the FDB, flooding is generated and traffic increases. Particularly, after the FDB is cleared, namely after all entries of the FDB are erased, it is apparent that the traffic greatly increases in accordance with the number of terminals connected to the node and the number of nodes cleared, resulting in the problem that a sudden increase in the traffic allows an increase in the link capacity giving influence on the data traffic of the users not related in direct to a fault.

Moreover, since the master node playing the principal role in the ring redundant system of the related art is set as it is fixed, clearing of the FDB is also required even after the fault is repaired, resulting in the problem that congestion of the network is generated because of packet loss and flooding, which should not be generated intrinsically.

SUMMARY OF THE INVENTION

The present invention has been proposed to solve the problems of the related art explained above and an object of the present invention is therefore to provide a technique to minimize congestion and packet loss, which may be generated when a fault is detected in a ring type packet network or when the network recovers from such a fault.

According to one preferred mode of the repeater of the present invention to attain the object explained above, the repeater which is provided with a plurality of ports for transmitting and receiving packets in order to form a ring type network for transmitting the received packets on the basis of the address included in the received packet and the transmitting port database indicating correspondence to an identifier of the port to transmit the packet having the address as the destination is characterized in comprising a control packet processing block for detecting reception of a fault notifying packet transmitted from a repeater having detected the fault, and a control block for updating, upon reception of the fault notifying packet from an immediately adjacent repeater, the port identifier of the transmitting port database having the port identifier of the port having received the fault notifying packet into the port identifier of the port connected to the other immediately adjacent repeater.

Moreover, in this repeater, the transmitting port database may be constituted to indicate correspondence to the number of hops indicating the number of repeaters used to transfer the packet having the address as the destination up to the outside of the ring type network, the control packet processing block may be constituted to extract, upon reception of the fault notifying packet, the number of hops in the fault section indicating the number of repeaters used to transfer the packet up to its own repeater from the fault section included in the fault notifying packet and notifies the number of hops to the control block, and the control block may be constituted to update, upon reception of the fault notifying packet from an immediately adjacent repeater, the port identifier of the transmitting port database having the port identifier of the port having received the fault notifying packet as the transmitting destination to the port identifier of the port connected to the other immediately adjacent repeater for the corresponding number of hops exceeding the number of hops in the fault section and also updates the corresponding number of hops to a value attained by subtracting the number of hops written into the transmitting port database from the total number of repeaters.

According to another mode of the repeater of the present invention to attain the object explained above, the repeater provided with a plurality of ports for transmitting and receiving packets to form a ring type network is characterized in comprising a transmitting port database indicating correspondence among (1) an address included in the received packet, (2) a port identifier to transmit the packet having the address as the destination, and (3) the number of hops indicating the number of repeaters used to transfer the packet having the address as the destination up to the external side of the ring type network, a packet processing block for determining a transmitting destination port of the received packet on the basis of the transmitting port database and transmitting the received packet from the determined port, a control packet processing block for detecting reception of a fault notifying packet transmitted from the repeater having detected a fault, extracting the number of hops in a fault section indicating the number of repeaters used to transfer the packet up to its own repeater from the fault section included in the fault notifying packet, and notifying the number of hops in the fault section to a control block, and a control block for updating an identifier of the port having received a fault notifying packet, the number of hops corresponding to the port identifier of the transmitting port database, and the number of hops corresponding to the port identifier of the transmitting port database on the basis of the extracted number of hops in the fault section.

Moreover, this repeater may be constituted to further comprise a port supervisory control block for detecting generation of a communication fault to an immediately adjacent repeater and notifying to the control block, wherein the control block may be constituted to output an instruction to transmit the fault notifying packet setting the initial value to the hop number field to the control packet processing block, and also output an instruction to transfer the fault notifying packet setting the value attained by adding one (1) to the extracted number of hops in the fault section in the hop number field to the repeater of the next stage responding to the notification for reception of the fault notifying packet from an immediately adjacent repeater.

Moreover, the port supervisory control block may be constituted to notify, to the control block, any of the forwarding state and blocking state of two ports connected to an immediately adjacent node, the control block may be constituted to periodically output, to the control packet processing block, an instruction to transmit the management packet having a ring node number field and a hop number field setting the initial value when the port in the blocking state exists, and the control packet processing block may be constituted to notify, when the port in the blocking state exists, the value of the hop number field of the management packet to the control block as the number of ring nodes upon reception of the management packet and also transmits the management packet setting the number of ring nodes to the ring node number field in the timing of the next transmission, and also to notify, when the port in the blocking state does not exist, the value in the ring node number field of the management packet to the control block upon reception of the management packet and updates the hop number field with a value attained by adding one (1) to the value of the hop number field and then transfers the value to the repeater in the next stage.

In addition, the port supervisory may also be constituted to detect and notify recovery of communication fault to the adjacent repeater to the control block and the control block may also be constituted to output, upon reception of a notice notifying recovery of the communication fault, the instruction for setting the port recovered from the fault to the blocking state to the port supervisory control block and to also output, when the port is the previously designated port, the instruction for setting the port to the forwarding state after passage of the predetermined period to the port supervisory control block.

Moreover, according to one preferred mode of the packet transferring method of the present invention, the packet transfer method in the repeater provided with a plurality of ports for transmitting and receiving packets to form a ring type network is characterized in comprising (1) a step of converting the packet received from the ports other than the port connected to the adjacent repeater, when it is transmitted from the port connected to the adjacent repeater, into the packet in which a ring tag including the hop number field setting the initial value is added and transmitting such packet to the port connected to the adjacent repeater, (2) a step of recording, to the transmitting port database, the correspondence among the transmit source address of the packet, the identifier of the port having received the packet, and the predetermined value as the number of hops indicating the number of repeaters used to transmit the packet to the outside of the ring type network, (3) a step of recording, to the transmitting port database, the correspondence among the transmitting source address of the packet, identifier of the port having received the packet, and the value of the hop number field of the packet upon reception of the packet in which the ring tag is added and transmitting the packet in which the hop number field is updated with the value obtained by adding one (1) to the value of the hop number field of the packet from the output port determined in accordance with the transmitting port database, (4) a step of extracting, upon reception of the fault notifying packet transmitted from the repeater which as detected a fault, the number of hops in the fault section indicating the number of repeaters used to transfer the packet up to the repeater having received the fault notifying packet from the fault section included in the fault notifying packet, and (5) a step of updating the number of hops corresponding to the port identifier of the transmitting port database on the basis of the identifier of the port having received the fault notifying packet, the number of hops corresponding to the port identifier of the transmitting port database, and the number of hops in the extracted fault section.

According to the present invention, since the port identifier of the transmitting port database (FDB) having the port used for reception as the transmitting destination is defined as the port identifier of the port connected to the other adjacent repeater, upon reception of the fault notifying packet from one adjacent repeater in the ring type network, the packet which has been transmitted to the repeater in the fault generating side can be transferred to the repeater in the inverse direction and thereby congestion of network can be avoided because the FDB is not cleared when a fault is generated and the resultant flooding is never generated.

Moreover, according to the present invention, since entry of the FDB which is altered bridging over the fault section when a fault is generated in the ring network is changed to detour the fault section, congestion of network can be avoided because the FDB is not cleared when the fault is generated and the resultant flooding is never generated.

Moreover, since a blocking port is set, at the time of recovery from the fault, in the section where a fault has been generated, it is no longer required to alter and clear the FDB, and accordingly congestion of network due to packet loss and flooding can also be eliminated.

BRIEF DESCRIPTION OF THE DRAWINGS

FIG. 6 is a diagram illustrating an example of an FDB.

FIG. 8 is a diagram illustrating the FDB of each node under the normal condition.

DETAILED DESCRIPTION OF THE PREFERRED EMBODIMENTS

The preferred embodiments of a packet transmitting apparatus of the present invention will be explained in detail with reference to the accompanying drawings.

Figure 1:
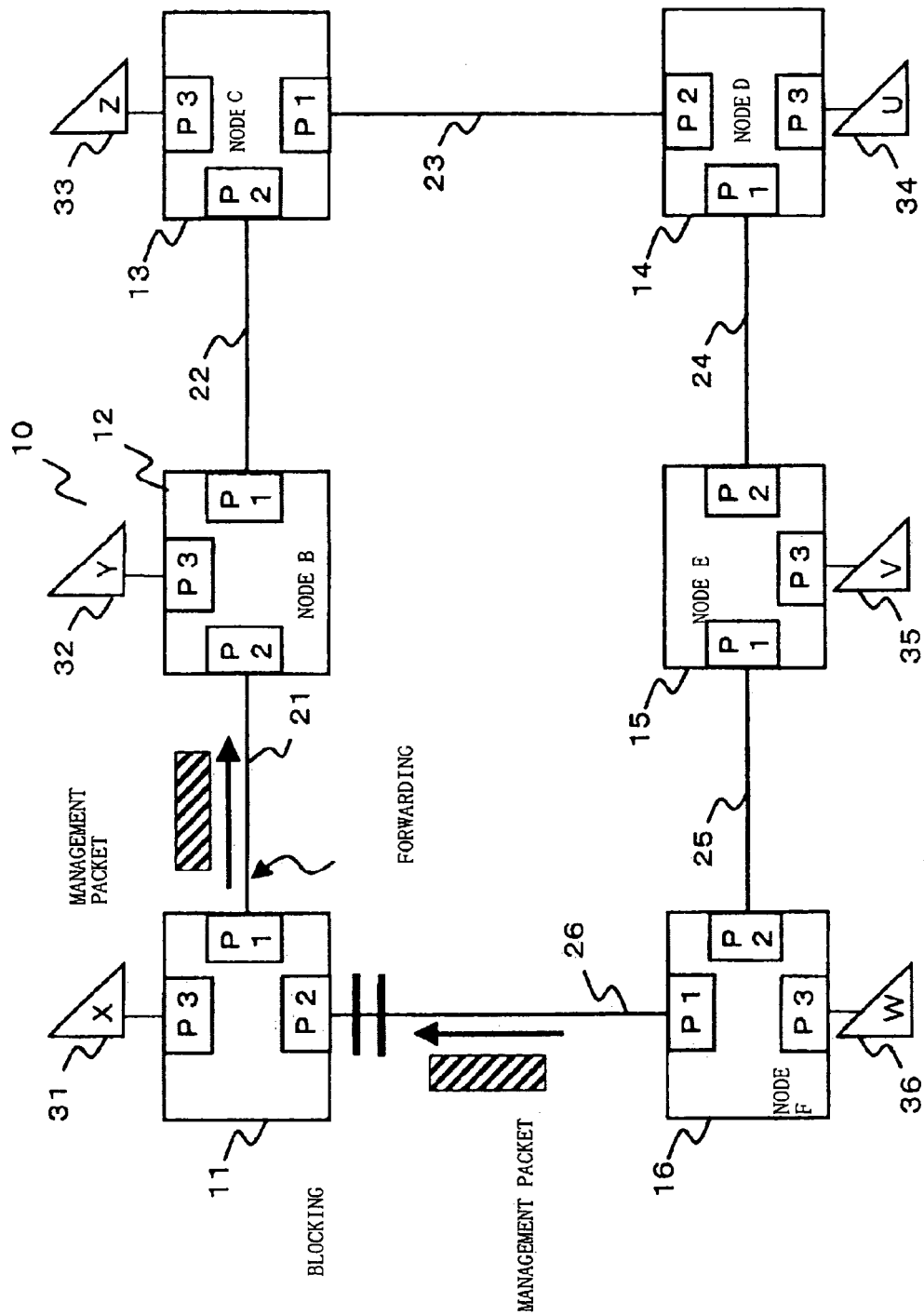
FIG. 1 is a diagram illustrating an example of a ring type network of the present embodiment.

FIG. 1 is a diagram illustrating an example of a ring type network of the present embodiment.

The nodes A11 to F16 form a L2SW device as a repeater forming a ring type network, in which port P1 is the primary port of one node and port P2 is the secondary port of an adjacent node and form the ring type network 10. For example, the first port P1 to form the ring is connected, in node A11, to the second port P2 of node B12 via transmission link 21, while the secondary port P2 to form the ring is connected to the first port P1 of the adjacent node F16 via transmission link 26. The port and transmission link are formed to enable two-way communication.

Moreover, port P3 of each node is connected with terminals 31 to 36 and the MAC addresses of these terminals are defined as X, Y, Z, U, V, and W. Only one port P3 for connection of a terminal of each node is indicated for each node in order to simplify the illustration, but a plurality of ports for the connection of terminals may also be provided for connection of a plurality of terminals (segments) or a port for the connection of a terminal may not always be required.

In this structure, only one of the nodes A11 to F16 forming the ring is designated as the master node. In FIG. 1, node A11 is designated as the master node.

Figure 2:
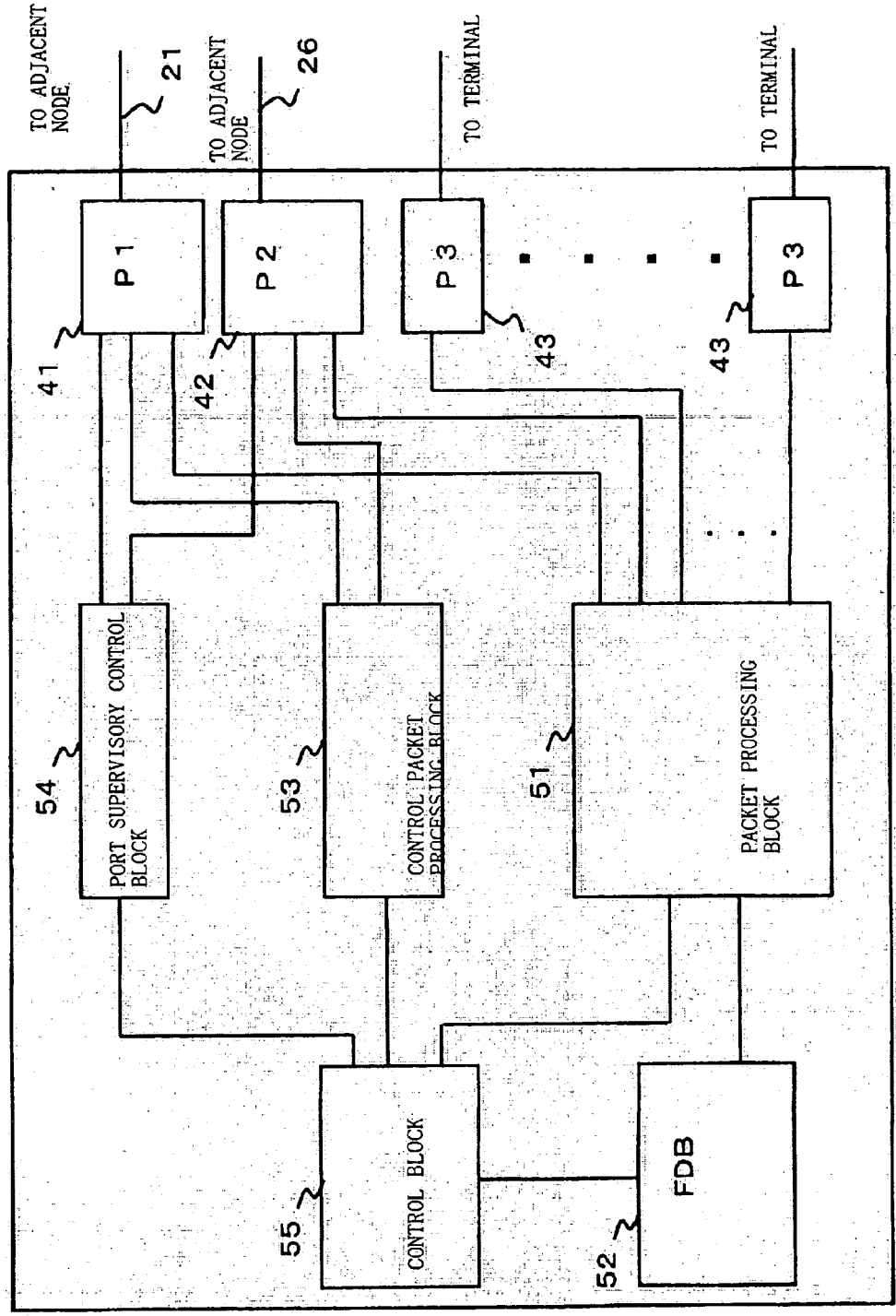
FIG. 2 is a structural diagram of a repeater (node) of the present invention.

FIG. 2 is a structural diagram of the repeater (node) in the present invention.

Port P1 41 and port P2 42 are respectively the primary port and secondary port for transmitting and receiving packets to and from the adjacent nodes, while port P3 43 is the port for transmitting and receiving packets to and from the terminals or segments in the outside of the ring type network, and packet processing block 51 has the function to process the packets received from each port and to transmit the packets to the correct port with reference to the FDB 52.

The FDB 52 is the transmitting port database showing correspondence among the addresses included in the received packet, and an identifier of the port to transmit the packet having the address as the destination, and the number of hops showing the number of repeaters used to transmit the packets to the outside of the ring type network. The control packet processing block 53 has the function to process the control packets such as the management packet and fault notifying packet (explained below) to be transmitted and received among the nodes.

The port supervisory control block 54 has the function to supervise port P1 41 and port P2 42 connected to the adjacent nodes and send notification the fault information of the detected communication fault and link-OFF to the control block 55 and the function to control ports P1 and P2 respectively to the forwarding state or blocking state in accordance with the instruction of the control block.

Here, the forwarding state means the state for transmitting and receiving ordinary packets, while the blocking state means the state for not transmitting and receiving ordinary packets. The ordinary packets mean the packets other than the packets for supervising and controlling the ring, which are transmitted and received among the repeaters, such as the management packets and fault notifying packets (explained below). And the ordinary packets are transmitted and received among the terminals connected to the repeaters for the packet transfer service by the ring type network 10.

The control block 55 transmits and receives the packets to and from the packet processing block 51, FDB 52, control packet processing block 53, and port supervisory control block 54 and controls these blocks as required.

Operations under Normal Conditions

The normal operation of the repeaters (nodes) forming the ring type packet network of the present invention will be explained below.

The node A11 designated as the master node sets the secondary port P2 to the blocking state. This node A11 also transmits the management packet at an interval of several seconds to detect the state of the ring, from the primary port P1 to the ring.

Figure 3:
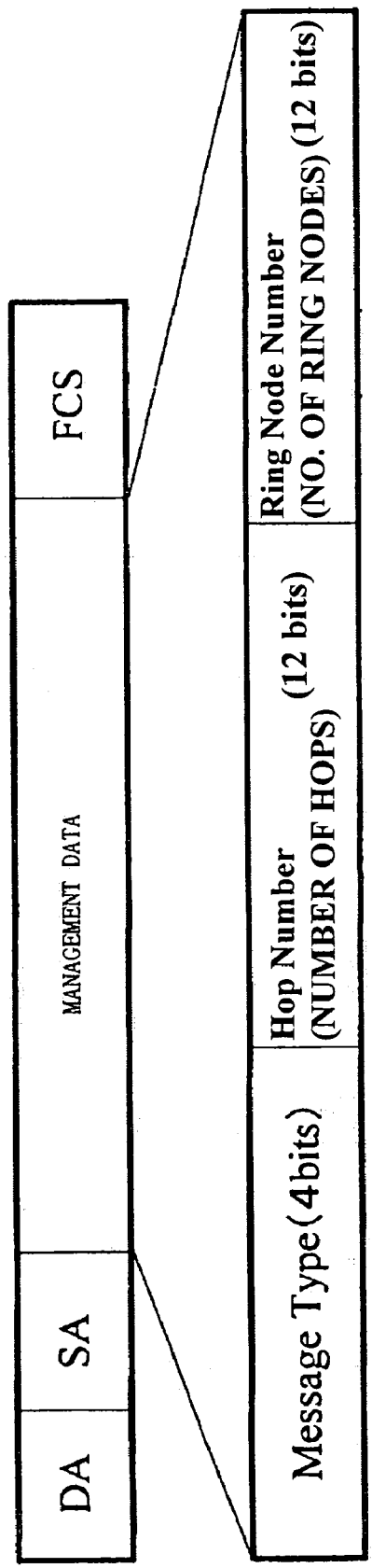
FIG. 3 is a diagram illustrating an example of frame format of the management packet.

FIG. 3 is a diagram illustrating an example of a frame format of the management packet.

The management packet is transmitted and received among the nodes forming the ring. The DA (Destination Address) field indicates the information of the destination node address, the SA (Source Address) field indicates the information of the transmitting source node address, the FCS (Frame Check Sequence) field indicates the information of the error detection code, and the management data field indicates the information of the network management.

The management data field is further formed of a message type field, a hop number field, and a ring node number field. The message type field indicates a type of the ordinary management packet and the fault notifying packet. In the hop number field, the initial value is set for the transmitting source node. The node having received this initial value updates this field with the number obtained by adding one (1) to the value of this field and then transfers the updated value to the next node.

The ring number field indicates the total number of nodes forming the ring.

Figure 4:
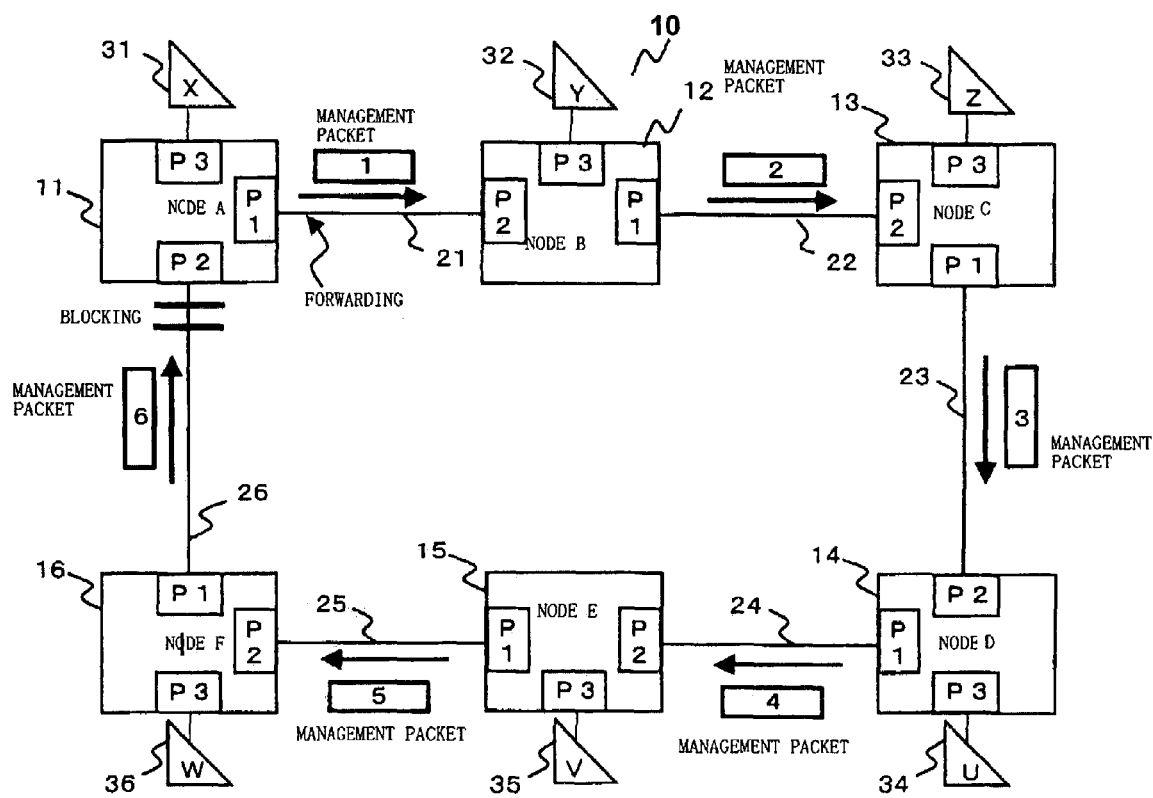
FIG. 4 is a diagram illustrating a profile of the transfer of the management packet.

FIG. 4 illustrates transfer of the management packet. The numerals of the management packet indicate the values of the hop number field.

Operations for setting the total number of nodes to the ring node number field will be explained below.

The master node A11 transmits the management packet in which the initial value "1" is set to the hop number field from the primary port P1. The first time the master node transmits the management packet, no value is set in the ring node number field. The node B12 having received the management packet at port P2 updates the hop number field of the management packet with the value "2" obtained by adding one (1) to the value "1" of the hop number field and then transmits this updated management packet from its own port P1 to node C13 of the next stage.

As explained above, each node having received the management packet from port P2 transmits the management packet through port P1, in which the value of the hop number field is incremented one by one and finally, the master node receives the management packet, having circulated once around the ring, at secondary port P2. In this case, the total number of nodes N ("6" in this embodiment) is recorded in the number field.

The master node A11 checks the normality of the ring by receiving the management packets having circulated the ring, holds the value of the hop number field as the total number of nodes N, and terminates, namely, cancels this packet. Then, the master node A11 sets "1" as the value of the hop number field and the total number of nodes N ("6") to the ring node number field in the next management packet transmission timing and thereafter transmits these values. Each node having received these values holds the total number of nodes N forming the ring. These operations are performed with control packet processing block 53 of each node and the total number of nodes N is notified to, and held in, the control block 55 of each node.

As explained above, the master node verifies normality of the ring transmission link using the management packet and the all nodes forming the ring type network recognize the total number of nodes.

Meanwhile, the normal packets from the outside of the ring network, namely the packets received at port P3 of each node, are processed and transferred in the following sequence.

The packets (MAC frames) received from the outside of the ring type network 10 are given a ring tag by packet processing block 51 when these packets are transferred to the ring network. The frames not transferred to the ring network, namely the frames received from the outside of the ring and transferred to the outside of the ring with the node are not processed and transferred directly.

Figure 5:
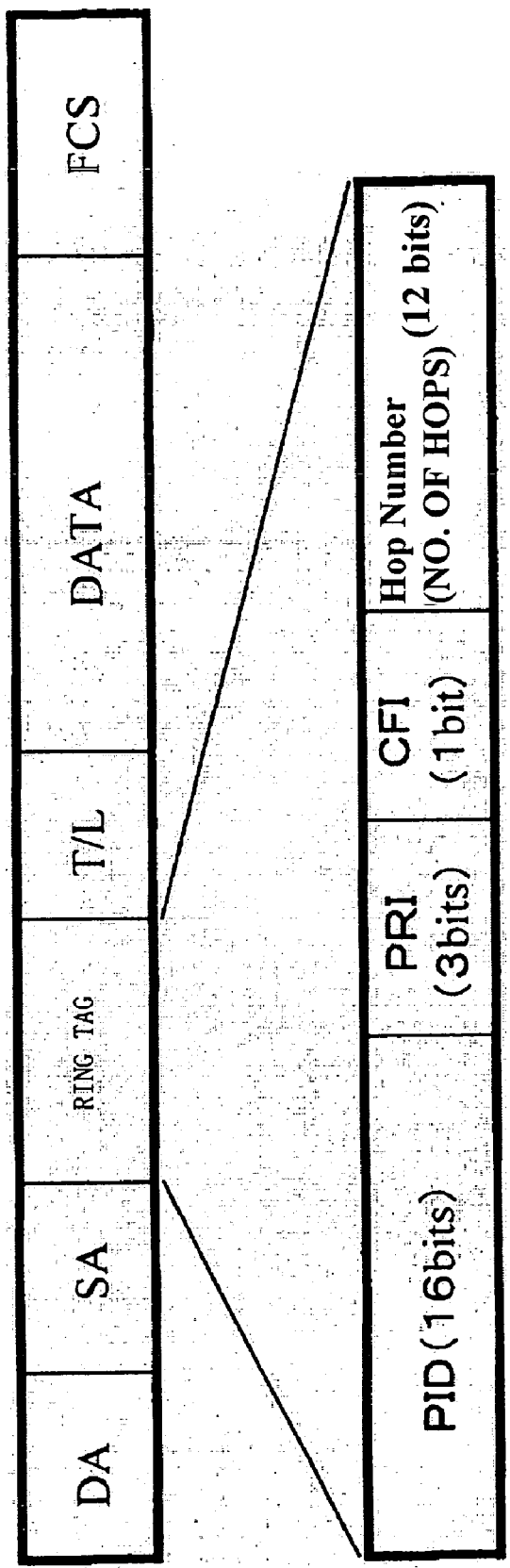
FIG. 5 is a diagram illustrating a frame format to which a ring tag is added.

FIG. 5 is a diagram illustrating a frame format to which the ring tag is added.

The fields other than the ring tag field to be added have the ordinary MAC frame format and therefore explanation of these fields is omitted here.

The ring tag field is further formed of a PID (Protocol Identifier) field, a PRI (PRIority) field, a CFI (Canonical Format Indicator) field, and a hop number field.

In the PID field, the identifier for identifying the frame to be transferred on the ring is stored and thereby each node can recognize at the time of receiving the frame that the frame is not the ordinary MAC frame by making reference to this field.

The PRI field is provided for setting the priority of frames to enable the setting of priority in eight steps.

The CFI field indicates the canonical identifier like the CIF bits in the VLAN tag of the IEEE 802.1Q regulation and this field always takes a value CFI=0 in the Ethernet®.

The hop number field is set to the initial value "1" in the node that received the MAC frame (packet) from port P3. It shows that the packet has been received from the external side of the ring network via only one node. Each node used for relaying the packet updates this field to the value obtained by adding one (1) to the value of this field and then transfers the updated value to the next node. Accordingly, the value in the hop number field of the received packet indicates the number of nodes forming the ring network with which the packet is received at the corresponding port.

FIG. 6 is a diagram illustrating an example of the FDB of node A11.

The FDB of the present invention is characterized in that a domain for indicating the number of corresponding hops in addition to the relationship between the address and the corresponding port (port identifier) in the FDB which the conventional L2SW device is provided.

Each entry of the FDB is generated as follows when the usual operation starts.

The terminal 31 connected to node A11 transmits the packet in which the SA is X, node A11 receives this packet at port P3. Accordingly, the entry of the number of hops:0 is formed at the address: X and port: P3. The number of hops:0 is set when port P3 is not used to form the ring.

When the terminal 32 connected to node B12 transmits the packet in which the SA is Y, node B12 receives this packet at port P3 and then transfers this packet to the ring network after addition of the ring tag thereto. The node A11 receives this packet at port P1. Accordingly, the entry when the number of hops is 1 is formed under the condition that the address is Y and port is P1. The number of hops: 1 has been obtained by making reference to the ring tag field of the received packets.

In the same manner, the entry where the address is Z, the port is P1, the number of hops is 2, the entry where the address is U, the port is P1, the number of hops is 3, the entry where the address is V, the port is P1, the number of hops is 4 and the entry where the address is W, the port is P1, the number of hops is 6 are formed in the FDB52 of node A11.

In above explanation, emphasis has been placed on the point of view of the node, but formation of the entry of the FDB where emphasis is placed on the point of view of transfer of the packet will be explained.

Figure 7:
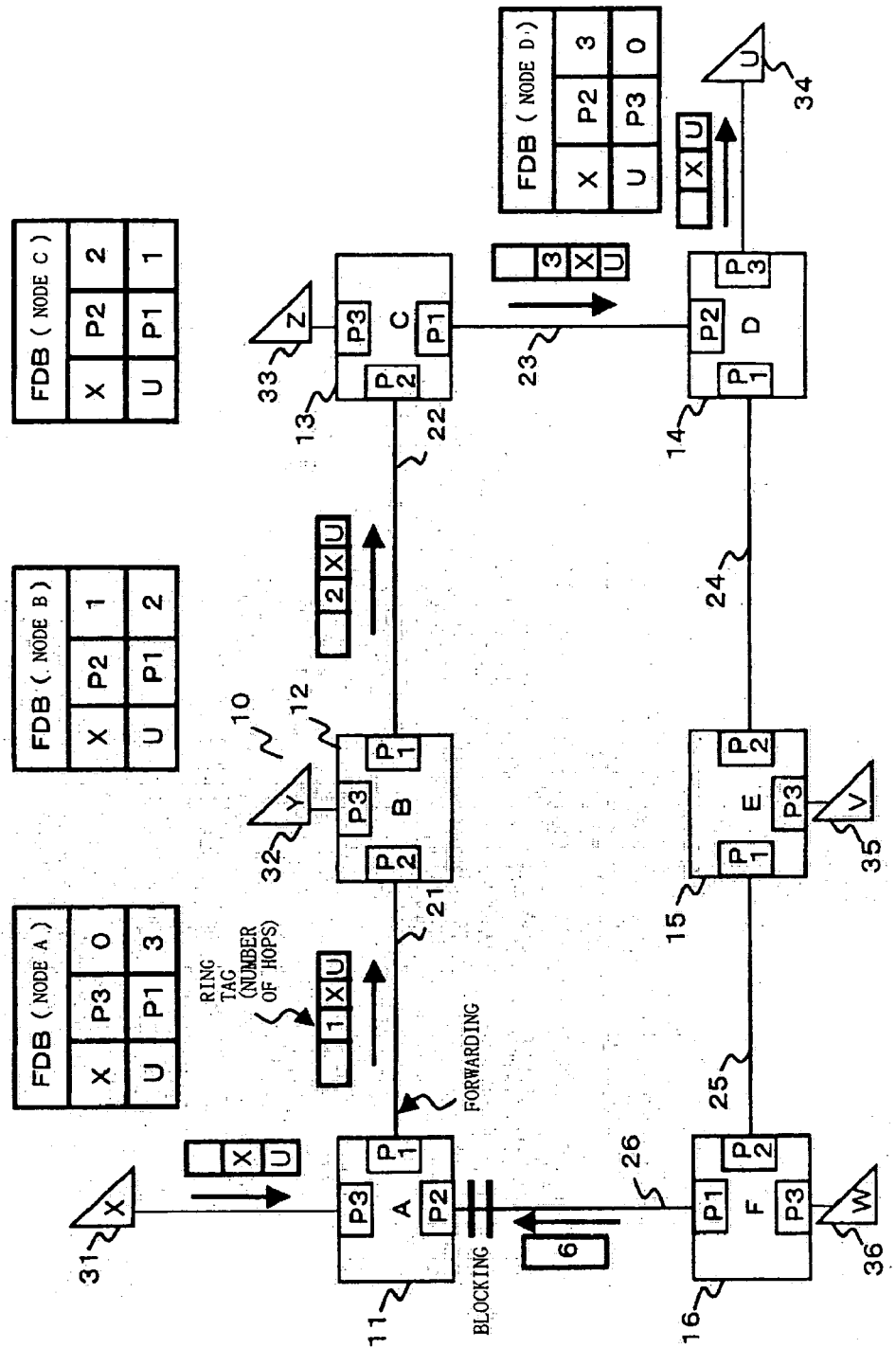
FIG. 7 is a diagram illustrating a relationship between packet transfer and each FDB entry.

FIG. 7 is a diagram illustrating the relationship between the transfer of packet and each FDB entry.

Transfer of the packet (MAC frame) by terminal 31 of the MAC address X connected to port P3 of node A11 to terminal 34 of the MAC address U connected to port P3 of node D14 will be explained below. In this case, it is assumed that the entry of address U already exists in the FDB.

The terminal 31 transmits the packet including the SA of X and DA of U. The node A11 receives this packet at port P3 and packet processing block 51 forms the entry where the address is X, the port is P3 and the number of hops is 0 in the FDB from the SA included in the packet. The packet processing block 51 searches the FDB (node A) with the DA:U and obtains port P1 with the entry being hit. Since port P1 forms the ring, the packet in which the ring tag of number of hops: 1 is added to the relevant packet is transmitted from port P1.

The node B12 receives this packet at port P2 and packet processing block 51 thereof forms the entry where the address is X, the port is port P2 and the number of hops is 1 to the FDB from the SA and the number of hops included in the packet. The packet processing block 51 searches the FDB (node B) with DA:U and obtains the port P1 with the entry being hit. Since port P1 is used to form the ring, the number of hops of the relevant packet is incremented by one (1) to update the number of hops to 2 and transmit this updated packet from port P1.

In the same manner, node C13 receives this packet at port P2 and packet processing block 51 thereof forms the entry where the address is X, the port is port P2, and the number of hops is 2 in the FDB from the SA and the number of hops included in the packet. The packet processing block 51 searches the FDB (node C) with DA:U and obtains port P1 with the entry being hit. Since port P1 is used to form the ring, the number of hops in the relevant packet is incremented by one (1) to update the number of hops to 3 and transmit the updated packet to port P1.

The node D14 receives this packet at port P2 and packet processing block 51 thereof forms the entry where the address is X, the port is port P2 and the number of hops is 3 in the FDB from the SA and the number of hops included in the packet. The packet processing block 51 searches the FDB (node D) with DA:U and obtains port P3 with the entry being hit. The port P3 is not used to form the ring, the ring tag of the relevant packet is deleted and this packet is transmitted from port P3. This packet is received by terminal 34.

When the entry of the address U does not exist in the FDB, the relevant node conducts the flooding to transfer the packet to all ports other than the ports having received the packet. Since node A11 is the master node, it does not transmit the packet to port P2 which is in the blocking state, the packet is transmitted to port P1. The other nodes transmit the packet to port P1 and port P3. The node F16 transmits the packet to node A11 but since port P2 of node A11 is in the blocking state, node A11 cancels this packet.

FIG. 8 illustrates the FDB of each node under the normal condition. The entries of all terminal addresses are generated in all nodes.

Operations When a Fault is Generated:

An example where a fault is generated between node C13 and node D14 under the conditions illustrated in FIG. 7 and FIG. 8 will be explained below.

Figure 9:
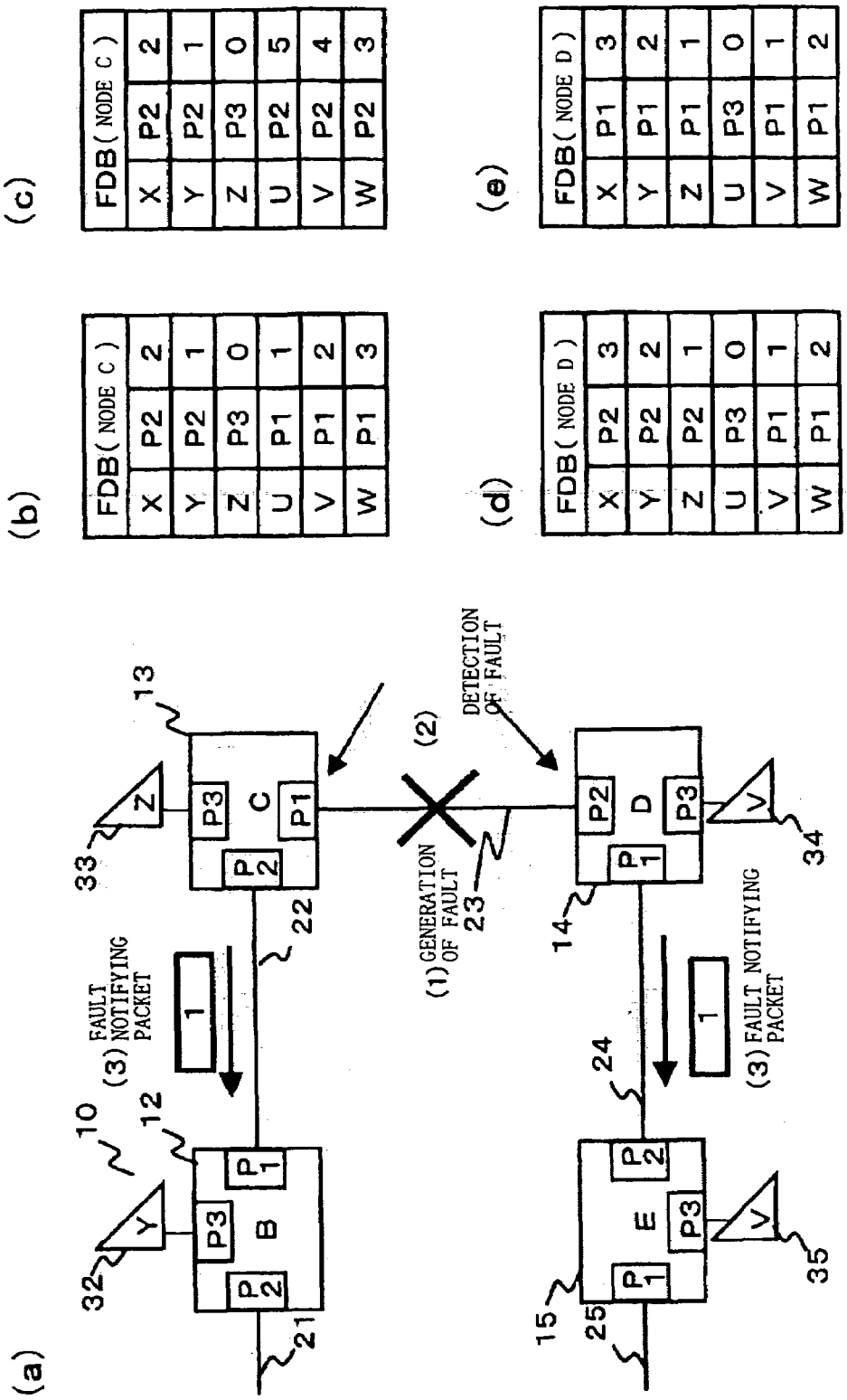
FIG. 9 is a diagram (1) for explaining operations when a fault is generated.
Figure 10:
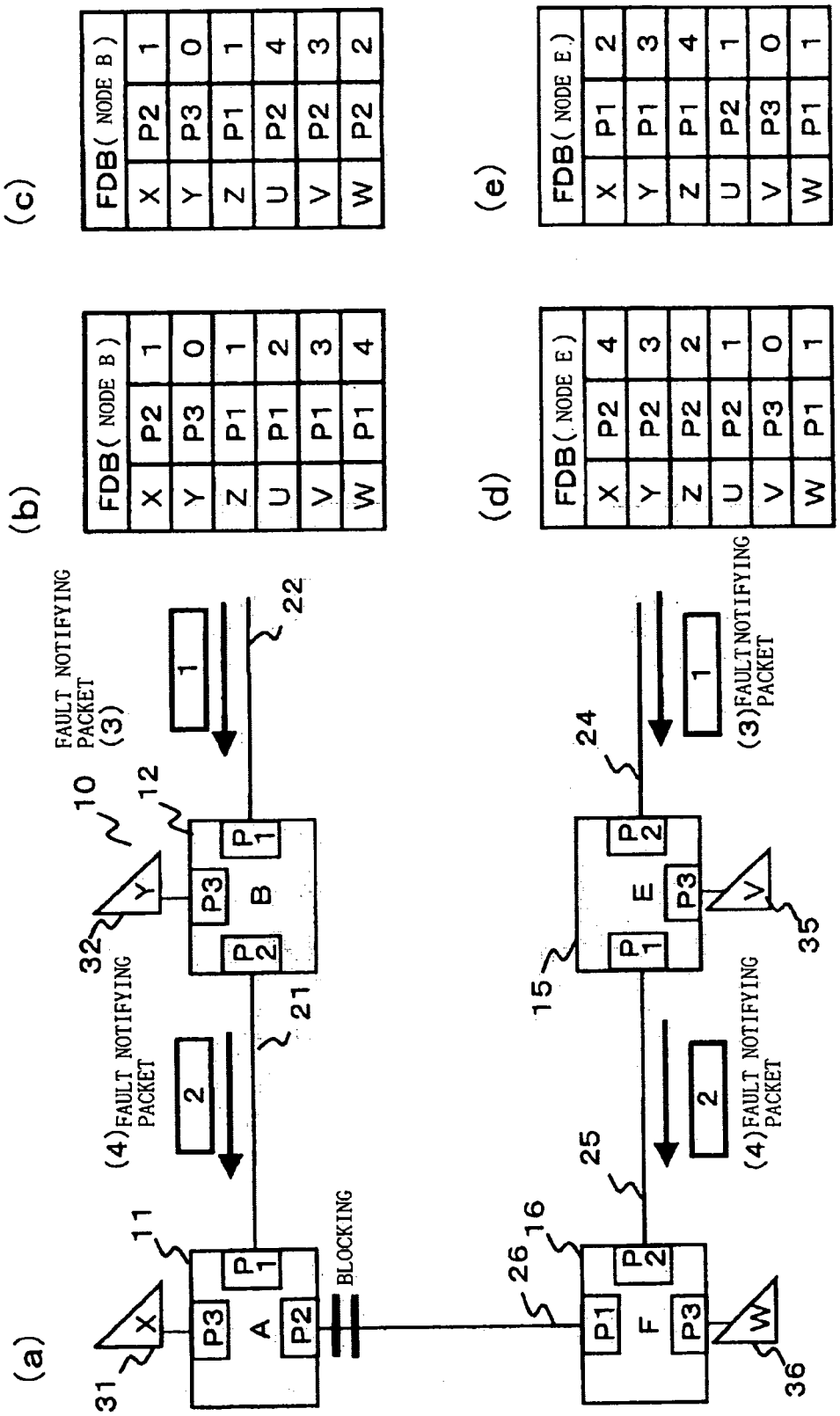
FIG. 10 is a diagram (2) for explaining operations when the fault is generated.
Figure 11:
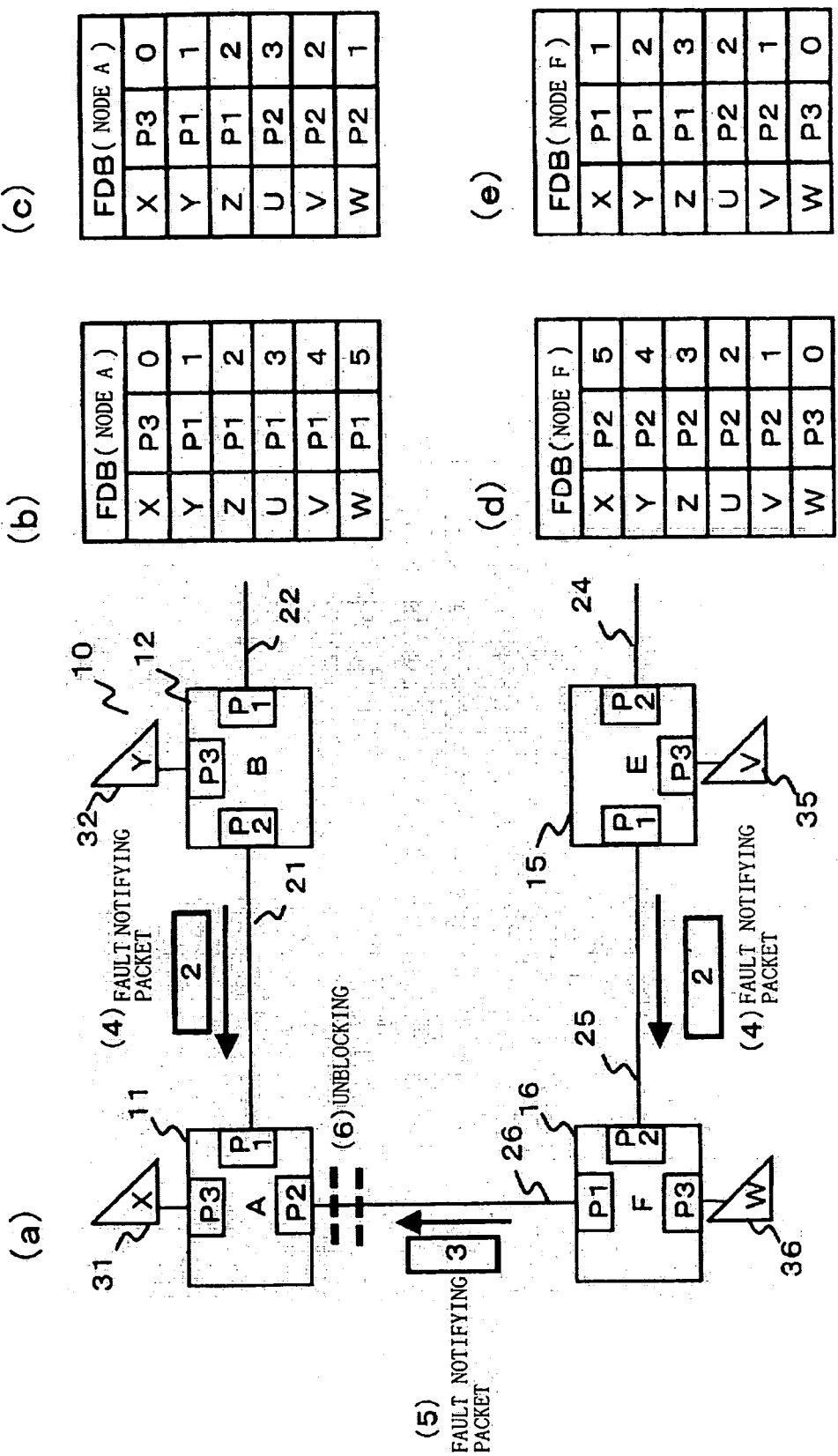
FIG. 11 is a diagram (3) for explaining operations when the fault is generated.

FIG. 9 is a diagram for explaining operation (1) when a fault is generated. FIG. 10 is a diagram for explaining operation (2) when a fault is generated. FIG. 11 is a diagram for explaining operation (3) when a fault is generated.

FIG. 9(a) is a diagram showing structures of node B12, node C13, node D14, and node E15 in the network structure illustrated in FIG. 7. If a fault is generated between node C13 and node D14, the port supervisory control block 54 in node C13 detects that the fault is generated in the transmission link connected to the primary port P1. In the same manner, of the port supervisory control block 54 of node D14 detects that the fault is generated in the transmission link connected to the secondary port P2 and notifies occurrence of fault to the control block 55 of each node.

The control block 55 having received the notification instructs, to the port in the opposite side of the ring from the port having detected the fault, the control packet processing block to transmit the fault notifying packet (trap packet) shown in FIG. 3 by setting the value of the hop number field showing the number of hops in the fault section to the initial value "1". Accordingly, node C13 transmits the fault notifying packet from port P2 and node D14 from port P1, respectively. In FIG. 9(a), the numerals in the fault notifying packets indicate the values of the hop number field.

Moreover, control block 55 searches the FDB52 of its own node using the identifier of the fault detecting port as the search key and updates, for the entry being hit, the relevant port identifier to that in the side where a fault is not detected to update the relevant number of hops to the value of (total number of nodes N)—(number of hops Ha being written at present). Since this number of hops is transmitted from the port where the relevant packet has detected the fault, it means that the entry is updated so that the packet is transferred in the opposite direction on the ring in order to avoid such transmission.

Update of FDB explained above will be explained more practically.

FIGS. 9(b) and 9(c) illustrate the normal FDB and the FDB in which a fault is generated in node C13, respectively.

In node C13, since the fault detecting port is port P1 and the port not detecting a fault is port P2, the FDB is searched in port P1 and the entries U, V, and W are hit. The port identifiers of these entries are updated to P2 from P1 and (N:6)−(Ha:1)=5 is written as the new number of hops in the entry U. In the similar manner, the number of hops of the entries V and W becomes 4 and 3 respectively.

FIGS. 9(d) and 9(e) illustrate the normal FDB and the FDEB where a fault is generated in node D14, respectively.

In node D14, the fault detecting port is port P2 and the port not detecting a fault is port P1, the FDB is searched in port P2 and the entries X, Y, and Z are hit. The port identifiers of these entries are updated to port P1 from port P2 and the (N:6)−(Ha:3)=3 is written as the new number of hops in the entry X. In the same manner, the number of hops of entries Y and Z becomes 2 and 1, respectively.

Next, operations of node B12 and node E15 having received the fault notifying packet will be explained.

FIG. 10(a) is a diagram illustrating a structure of node A11, node B12, node E15 and node F16 in the network structure of FIG. 7.

As explained above, node C13 and node D14 having detected the fault transmit the fault notifying packet in which the number of hops is set to 1 from the port having detected no fault.

The nodes having detected the fault notifying packet notify the receiving port and the number of hops to the control block 55 from the control packet processing block 53 thereof. Namely, node B12 receives the fault notifying packet in which the number of hops is set to 1 in port P1 and node E15 receives the fault notifying packet in which the number of hops is set to 1 in port P2. These fault notifying packets are notified to the control block 55.

This means that node B12 recognizes generation of fault at the first node, namely at node C13 in the side of port P1, while node E15 recognizes generation of fault at the first node, namely at node D14 in the side of port P2.

The control block 55 having received the notification notifies the instruction to transmit, to the port having received the packet and the port in the opposite direction on the ring, the fault notifying packet setting the value obtained by adding one (1) to the notified number of hops to the control packet processing block 53 and the control processing block 53 transmits the fault notifying packet. Namely, the fault notifying packet where the number of hops is set to 2 is transmitted from port P2 in node B12, while the fault notifying packet where the number of hops is set to 2 is transmitted from port P1 in node E15.

Moreover, the control block 55 searches the FDB52 of its own node using the port identifier having received the fault notifying packet as the search key and compares, for the entry being hit, the number of hops (Ha) of such entry with the value (Hb) of the hop number field of the fault notifying packet.

When (Ha)>(Hb), the port identifier of the relevant entry is updated to the port identifier in the opposite direction on the ring from the port having received the fault notifying packet and the relevant number of hops to the value obtained by (total number of nodes N)−(number of hops Ha written at present). It means that the relevant packet is transmitted from the port in the direction of the fault section and moreover the packet is transferred exceeding the fault section. In view of avoiding such transmission or transfer, entry is updated to transfer the packet on the ring from the opposite direction.

When (Ha)≧(Hb), the relevant entry is not altered. It means that the relevant packet is transmitted from the port in the direction of the fault section in which the packet is transferred to the outside of the ring until it reaches the fault section and the relevant entry has no problem for transfer of the packet.

Update of the FDB will be explained in more practical. Here, the total number of nodes N is 6.

FIGS. 10(b) and 10(c) illustrate the FDB before detection of the fault notifying packet and the FDB after detection thereof in node B respectively. Here, the value Hb of the hop number field of the fault notifying packet is 1.

Since the port for receiving the fault notifying packet is port P1 and the port in the opposite direction on the ring is port P2 in node B12, the control block 55 searches the FDB 52 in port P1 and the entries Z, U, V, and W are hit. Since the entry Z is (Ha:1)=(Hb:1), this entry is not updated.

Since (Ha: 2, 3, 4)>(Hb:1) in the entries U, V, and W, the port identifier of these entries is updated to P2 and the number of hops (N:6)−(Ha:2)=4 is written as the new number of hops in the entry U. In the similar manner, the number of hops in the entries V and W becomes 3 and 2, respectively.

FIGS. 10(d) and 10(e) indicate the FDBs before detection of fault notifying packet and after detection thereof in node E15, respectively. Here, the value Hb of the hop number field of the fault notifying packet is 1.

Since the receiving port of the fault notifying packet is port P2, while the port in the opposite direction is port P1 in node E15, the FDB is searched in port P2 and the entries X, Y, Z, U are hit. Since (Ha:1)=(Hb:1) in the entry U, this entry is not updated.

Since (Ha: 4, 3, 2)>(Hb:1) in the entries X, Y, Z, the port identifier of these entries is updated to P1 and the number of hops (N:6)−(Ha:4)=2 is written as the new number of hops in the entry X. In the similar manner, the number of hops becomes 3 and 4 in the entries Y and Z, respectively.

Next, operations of node A11 and node F16 having received the fault notifying packet will be explained.

FIG. 11(a) is a diagram illustrating a partial structure of node A11, node B12, node E15 and node F16 in the network structure of FIG. 7.

Since operation of node F16 is similar to that of node B12 and node E15, the operations thereof will be outlined below.

The node F16 receives the fault notifying packet in which the number of hops is 2 with port P2 and transmits the fault notifying packet in which the number of hops is 3 from port P1.

FIGS. 11(d) and 11(e) illustrate the FDBs before detection of the fault notifying packet and after detection thereof in node F16 and the entries X, Y, Z passing the fault section are updated.

Next, operation of node A11 as the master node will be explained.

FIGS. 11(b) and 11(c) illustrate the FDBs before detection of the fault notifying packet and after detection thereof in node A11. In regard to update of the FDB, node A11 operates like each node explained above and the entries U, V, W passing the fault section are updated.

The control block 55 of node A11 as the master node having received the notification for reception of the fault notifying packet outputs the control signal to port supervisory control block 54 to update the secondary port P2 being set to the blocking state to the forwarding state. Accordingly, transfer of packet is enabled to avoid the fault section in accordance with alteration of each FDB.

(3) Operations When a Fault is Restored

An example where operations when a fault is generated illustrated in FIG. 9, FIG. 10 and FIG. 11 are completed, and then, the fault is repaired between node C13 and node D14 will be explained below.

Figure 12:
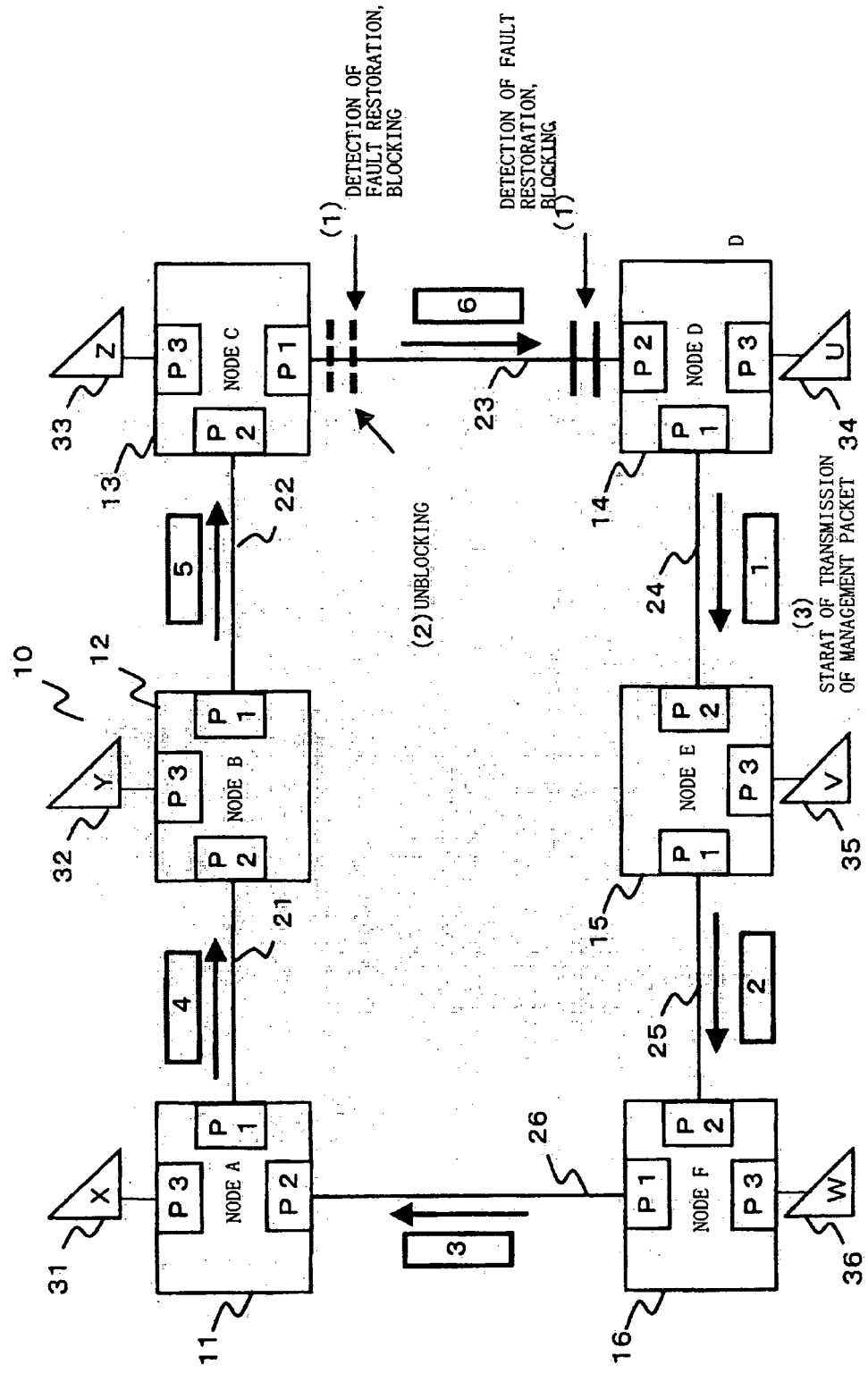
FIG. 12 is a diagram for explaining operations when the fault is restored.
Figure 13:
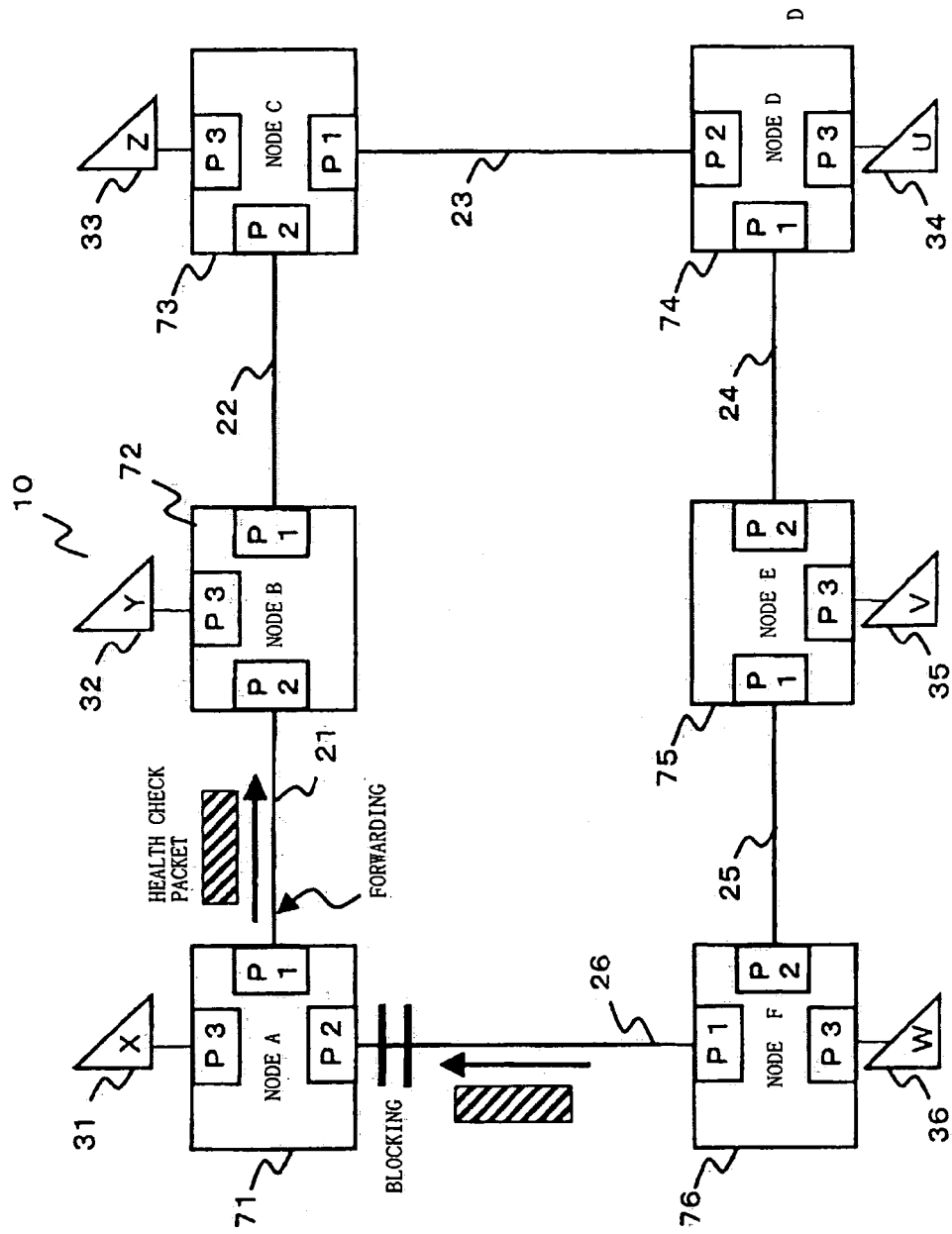
FIG. 13 is an explanatory diagram of the existing redundant system of the ring type network.
Figure 14:
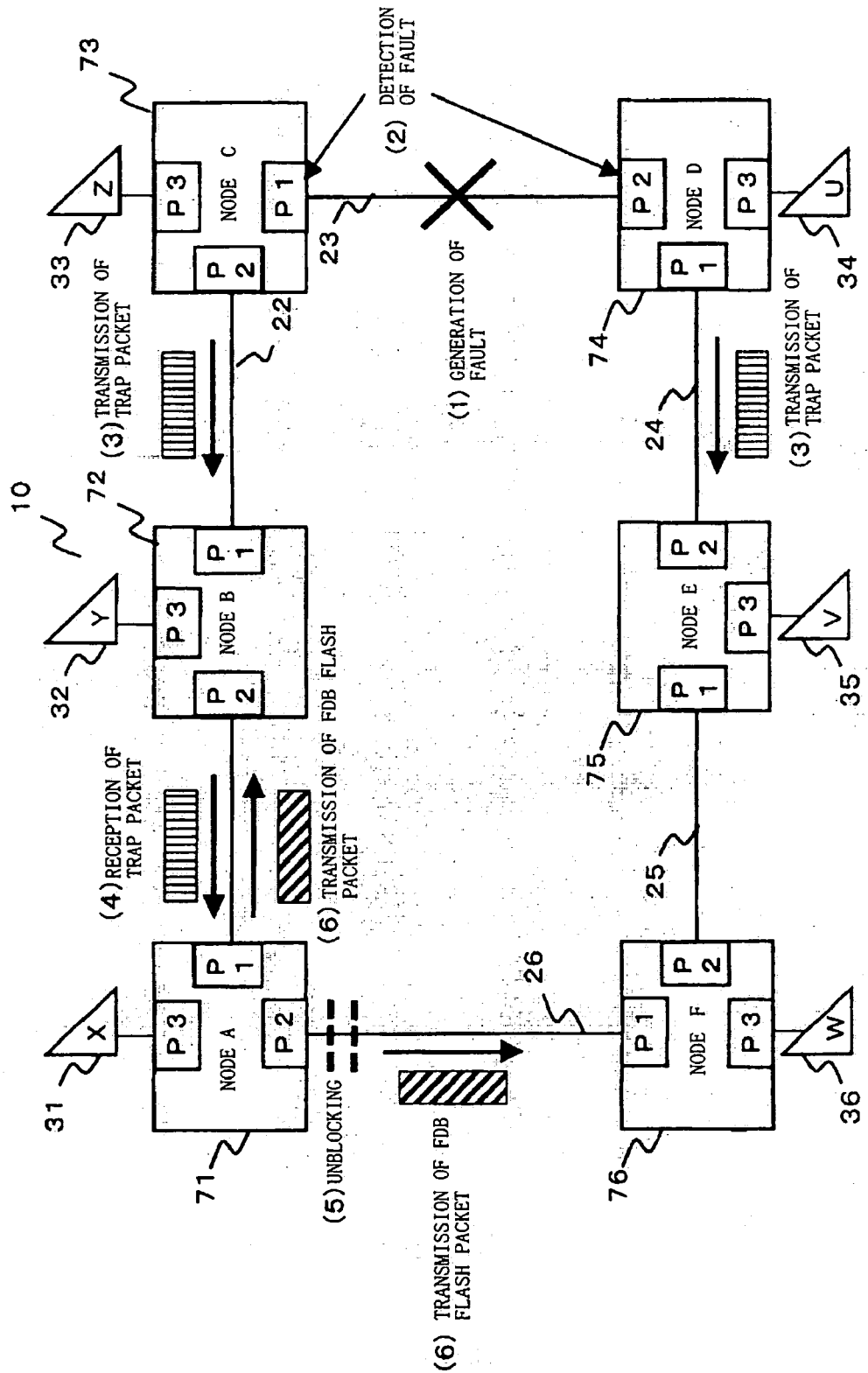
FIG. 14 is an explanatory diagram (2) of the existing redundant system of the ring type network.

FIG. 12 is a diagram for explaining operations when a fault is restored.

When the fault between node C13 and node D14 is restored, in order to prevent formation of a loop, the port which has detected the fault is set temporarily to the blocking state in which the ordinary packets (data frames) are not allowed to pass. Namely, in node C13, recovery from fault condition of the primary port P1 is detected by port supervisory control block 55 and this information is then output to the control block 53. The control block 53 having received this information outputs the instruction to set the relevant port to the blocking state to port supervisory control block 55. As a result, the primary port P1 is set to the blocking state.

In the same manner, the secondary port P2 is set to the blocking state in node D14.

Here, when the ling is in the normal condition, (1) the master node is required, as explained for the normal operation, in which the management packet is transmitted and the primary port P2 is in the blocking state, but (2) node A11 which has been in the master node does not perform the function as the master node in this case.

Therefore, node D14 in which the secondary port has detected a fault functions as the new master node in the ring. Therefore, node D14 starts, as the master node, the transmission of management packet from its own primary port P1 in the interval of several seconds. Namely, the control block of node D14 outputs, upon recognition of fault restoration in the secondary port P2 with the notification from port supervisory control block 55, the instruction to start transmission of the management packet explained for the normal operation in the interval of several seconds to the control packet processing block 54.

The node C13 alters, upon reception of the management packet from the master node D14, its own primary port P1 to the forwarding state from the blocking state. Namely, when reception of the management packet is recognized with the notification from port supervisory control block 55, node C13 outputs the instruction to alter the primary port P1 to the forwarding state from the blocking state to the port supervisory control block. With the operations explained above, the normal ring network condition can be recovered in which node D14 is the master node.

As explained above, according to the present invention, if a fault is generated in the transmission link of the ring network, the FDB of each node is updated not only for the entry having the address passing the fault section but also for detouring the fault section. Accordingly, it is no longer required to clear the FDB and flooding is never generated. Therefore, the resultant congestion of ring network can be avoided.

Moreover, since the total number of nodes required for update of the FDB may be obtained by periodically circulating the packets having the predetermined fields counted up with each node through the ring network, the information of node identifier and/or the connecting sequence thereof is no longer required and such information may be acquired easily even when nodes are added or deleted.

Moreover, since each node updates the FDB so that it is transferred to the detour without waiting for the instruction from the master node, a packet loss generating time can be shortened. Particularly, when the total number of nodes is large and a fault is generated in nodes (having a large number of hops) which is distant from the master node, this effect is distinctive.

In addition, the number of hops between the fault detecting node and its own node which is required for update of the FDB can also be obtained easily even when nodes are added or deleted without the information of node identifier and/or connecting sequence thereof because the packet having the predetermined field which is counted up with each node is transmitted from the fault detecting node.

Moreover, when a fault in the transmission link of the ring network is restored, one of the fault detecting nodes performs the function of the master node and the preceding fault section is set to the blocking state. Therefore, the FDB updated due to occurrence of fault can be used in direct as the FDB of each node and the clear of FDB which has been required when the master node has been assigned to the fixed node is no longer required. Accordingly, congestion resulting from packet loss and flooding which should not be generated intrinsically can be eliminated.

The principal inventions disclosed in this specification will be summarized below.

A repeater which is provided with a plurality of ports for transmitting and received packets in order to form a ring type network for transmitting the received packets on the basis of the address included in the received packet and the transmitting port database indicating correspondence to an identifier of the port to transmit the packet having the address as the destination, characterized in comprising a control packet processing block for detecting reception of a fault notifying packet transmitted from a repeater having detected the fault, and a control block for updating, upon reception of the fault notifying packet from an immediately adjacent repeater, the port identifier of the transmitting port database having the port identifier of the port having received the fault notifying packet into the port identifier of the port connected to the other immediately adjacent repeater.

The repeater described above characterized in that the transmitting port database indicates correspondence to the number of hops indicating the number of repeaters used to transfer the packet having the address as the destination up to the outside of the ring type network, the control packet processing block extracts, upon reception of the fault notifying packet, the number of hops in the fault section indicating the number of repeaters used to transfer the packet up to its own repeater from the fault section included in the fault notifying packet and notifies said number of hops to the control block, and the control block updates, upon reception of the fault notifying packet from an immediately adjacent repeater, the port identifier of the transmitting port database having the port identifier of the port having received the fault notifying packet as the transmitting destination to the port identifier of the port connected to the other immediately adjacent repeater for the corresponding number of hops exceeding the number of hops in the fault section and also updates the corresponding number of hops to a value attained by subtracting the number of hops written into the transmitting port database from the total number of repeaters. (2)

(Additional Note 3)

A repeater provided with a plurality of ports for transmitting and receiving packets to form a ring type network, characterized in comprising a transmitting port database indicating correspondence among an address included in the received packet, a port identifier to transmit the packet having the address as the destination, and the number of hops indicating the number of repeaters used to transfer the packet having the address as the destination up to the external side of the ring type network, a packet processing block for determining a transmitting destination port of the received packet on the basis of the transmitting port database and transmitting the received packet from the determined port, a control packet processing block for detecting reception of a fault notifying packet transmitted from the repeater having detected a fault, extracting the number of hops in a fault section indicating the number of repeaters used to transfer the packet up to its own repeater from the fault section included in the fault notifying packet, and notifying the number of hops in the fault section to a control block, and a control block for updating an identifier of the port having received a fault notifying packet, the number of hops corresponding to the port identifier of the transmitting port database, and the number of hops corresponding to the port identifier of the transmitting port database on the basis of the extracted number of hops in the fault section. (3)

(Additional Note 4)

The repeater described in the additional note 3, characterized in further comprising a port supervisory control block for detecting generation of a communication fault to an immediately adjacent repeater and notifying to the control block, wherein the control block outputs an instruction to transmit the fault notifying packet setting the initial value to the hop number field to the control packet processing block, and also outputs an instruction to transfer the fault notifying packet setting the value attained by adding one (1) to the extracted number of hops in the fault section in the hop number field to the repeater of the next stage responding to the notification for reception of the fault notifying packet from an immediately adjacent repeater. (4)

(Additional Note 5)

The repeater described in the additional note 3, characterized in that when the packets received from the ports other than that connected to the repeater are to be transmitted from the ports connected to the repeater, a ring tap including the hop number field being set to the initial value is added to the packets and correspondence among the transmitting source address of packets, identifier of the port having received the packets and the predetermined value as the number of hops is recorded to the transmitting port database, when the packets received from the ports connected to the repeater are to be transmitted from the ports connected to the repeater, the hop number field is updated with the value obtained by adding one (1) to the value of the hop number field of the packets and correspondence among the transmitting source address of the packets, the identifier of the port having received the packet and the value of the hop number field received as the number of hops is recorded to the transmitting port database, and when the packets received from the ports connected to the repeater is to be transmitted from the ports other than that connected to the repeater, the ring tag of the packets is deleted and the correspondence among the transmitting source address of the packets, identifier of the port having received the packets and the predetermined value as the number of hops is recorded to the transmitting port database.

(Additional Note 6)

The packet repeater described in the additional note 4, characterized in that the port supervisory control block notifies, to the control block, any of the forwarding state and blocking state of two ports connected to an immediately adjacent node, the control block periodically outputs, to the control packet processing block, an instruction to transmit the management packet having a ring node number field and a hop number field setting the initial value when the port in the blocking state exists, and the control packet processing block notifies, when the port in the blocking state exists, the value of the hop number field of the management packet to the control block as the number of ring nodes upon reception of the management packet and also transmits the management packet setting the number of ring nodes to the ring node number field in the timing of the next transmission, and also notifies, when the port in the blocking state does not exist, the value in the ring node number field of the management packet to the control block upon reception of the management packet and updates the hop number field with a value attained by adding one (1) to the value of the hop number field and then transfers the value to the repeater in the next stage. (5)

(Additional Note 7)

The repeater described in the additional note 6, characterized in that the port supervisory control block detects recovery from the communication fault to the adjacent repeater and notifies recovery to the control block, and the control block outputs, upon reception of a notice for recovery from communication fault, the instruction to set the port recovered from the fault to the blocking state to the port supervisory control block and also outputs, when the port is previously designated, the instruction to set the port to the forwarding state after passage of the predetermined period to the port supervisory control block.

(Additional Note 8)

A packet transfer method in the repeater which is provided with a plurality of ports for transmitting and receiving packets to form a ring type network, characterized in comprising the steps of converting the packets, when the packets received from the ports other than that connected to the adjacent repeaters are to be transmitted from the ports connected to the adjacent repeaters, into the packets to which a ring tag including the hop number field setting the initial value and then transmitting these packets to the ports connected to the adjacent repeaters, recording, to the transmitting port database, the correspondence among the transmitting source address of the packets, identifiers of the ports having received the packets, and the predetermined value as the number of hops indicating the number of repeaters used to transfer the packets to the outside of the ring type network, recording, upon reception of the packets to which the ring tags are added, the correspondence among the transmitting source address of the packets, port identifiers of the ports having received the packets, and the value of the hop number field of the packets to the transmitting port database and then transmitting the packets having updated the hop number field with the value obtained by adding one (1) to the value of the hop number field of the packets from t he output port determined in accordance with the transmitting port database, extracting, upon reception of the fault notifying packet transmitted from the repeater having detected the fault, the number of hops in the fault section indicating the number of repeaters used to transfer the packet to the repeater having received the fault notifying packet from the fault section, and updating the port identifier of the transmitting port database and the corresponding number of hops on the basis of the identifier of the port having received the fault notifying packet, the number of hops corresponding to the port identifier of the transmitting port database and the extracted number of hops in the fault section.

(Additional Note 9)

The packet transfer method described in the additional note 8, characterized in further comprising the steps of updating the port identifier of the entry having the identifier of the port having detected a fault among the transmitting port database to the identifier of the port connected to the other adjacent repeater upon reception of the fault of one adjacent repeater and then updating the corresponding number of hops to the value obtained by subtracting the number of hops which are written at present from the total number of repeaters, transmitting the fault notifying packet setting the initial value as the number of hops in the fault section, and transferring, upon detection of the fault notifying packet, the value obtained by adding one (1) to the number of hops in the fault section as the new number of hops in the fault section to the repeater of the next stage.

As explained above, congestion of traffic when a fault is generated in the ring type network can be eliminated, packet loss and congestion when the fault is restored can also be avoided, and highly efficient application of the present invention can also be attained in the packet transmission field.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A repeater having a plurality of ports for transmitting and receiving packets in order to form a ring type network for transmitting the received packets on the basis of an address included in a received packet and a transmitting port database indicating correspondence to an identifier of a port to transmit the packet having the address as the destination, comprising
a control packet processing block operable to detect reception of a fault notifying packet transmitted from a repeater having detected a fault; and
a control block operable to update, upon reception of the fault notifying packet from an immediately adjacent repeater, a port identifier of the transmitting port database having a port identifier of the port having received said fault notifying packet into a port identifier of a port connected to another immediately adjacent repeater, wherein
the transmitting port database is further operable to indicate correspondence to a number of hops indicating a number of repeaters used to transfer the packet having the address as the destination up to a outside of the ring type network,
the control packet processing block is further operable to extract, upon reception of said fault notifying packet, the number of hops in the fault section indicating the number of repeaters used to transfer the packet up to its own repeater from the fault section included in the fault notifying packet and to notify the number of hops to the control block, and
the control block is further operable to update, upon reception of the fault notifying packet from an immediately adjacent repeater, the port identifier of the transmitting port database having the port identifier of the port having received the fault notifying packet as the transmitting destination to the port identifier of the port connected to the other immediately adjacent repeater for the corresponding number of hops exceeding the number of hops in the fault section and also updates the corresponding number of hops to a value attained by subtracting the number of hops written into the transmitting port database from the total number of repeaters.

2. A repeater having a plurality of ports for transmitting and receiving packets to form a ring type network, comprising:
a transmitting port database operable to indicate correspondence among an address included in a received packet, a port identifier to transmit a packet having the address as the destination, and a number of hops indicating a number of repeaters used to transfer the packet having the address as the destination up to an external side of the ring type network;
a packet processing block operable to determine a transmitting destination port of the received packet on the basis of the transmitting port database and transmitting the received packet from the determined port;
a control packet processing block operable to detect reception of a fault notifying packet transmitted from the repeater having detected a fault, extracting the number of hops in a fault section indicating the number of repeaters used to transfer the packet up to its own repeater from the fault section included in the fault notifying packet, and notifying the number of hops in the fault section to a control block;
a control block operable to update an identifier of the port having received a fault notifying packet, the number of hops corresponding to the port identifier of the transmitting port database, and the number of hops corresponding to the port identifier of the transmitting port database on the basis of the extracted number of hops in the fault section; and
a port supervisory control block operable to detect generation of a communication fault to an immediately adiacent repeater and to notify to the control block, wherein
the control block is operable to output an instruction to transmit the fault notifying packet setting the initial value to the hop number field to the control packet processing block, and also outputs an instruction to transfer the fault notifying packet setting the value attained by adding one (1) to the extracted number of hops in the fault section in the hop number field to the repeater of the next stage responding to the notification for reception of the fault notifying packet from an immediately adjacent repeater,
the port supervisory control block is operable to notify, to the control block, any of the forwarding state and blocking state of two ports connected to an immediately adjacent node;
the control block periodically is operable to output, to the control packet processing block, an instruction to transmit the management packet having a ring node number field and a hop number field setting the initial value when the port in the blocking state exists; and
the control packet processing block is operable to notify, when the port in the blocking state exists, the value of the hop number field of the management packet to the control block as the number of ring nodes upon reception of the management packet and also transmits the management packet setting the number of ring nodes to the ring node number field in the timing of the next transmission, and to notify, when the port in the blocking state does not exist the value in the ring node number field of the management packet to the control block upon reception of the management packet and updates the hop number field with a value attained by adding one (1) to the value of the hop number field and then transfers the value to the repeater in the next stage.

3. A repeater having a plurality of ports for transmitting and receiving packets to form a ring type network, comprising:
a transmitting port database operable to indicate correspondence among an address included in a received packet, a port identifier to transmit a packet having the address as the destination, and a number of hops indicating a number of repeaters used to transfer the packet having the address as the destination up to an external side of the ring type network;
a packet processing block operable to determine a transmitting destination port of the received packet on the basis of the transmitting port database and transmitting the received packet from the determined port;

a control packet processing block operable to detect reception of a fault notifying packet transmitted from the repeater having detected a fault, extracting the number of hops in a fault section indicating the number of repeaters used to transfer the packet up to its own repeater from the fault section included in the fault notifying packet, and notifying the number of hops in the fault section to a control block; and a control block operable to update an identifier of the port having received a fault notifying packet, the number of hops corresponding to the port identifier of the transmitting port database, and the number of hops corresponding to the port identifier of the transmitting port database on the basis of the extracted number of hops in the fault section, wherein when the packets received from ports other than that connected to the repeater are to be transmitted from the ports connected to the repeater, a ring tap including the hop number field being set to the initial value is added to the packets and correspondence among the transmitting source address of packets, identifier of the port having received the packets and the predetermined value as the number of hops is recorded to the transmitting port database, when the packets received from the ports connected to the repeater are to be transmitted from the ports connected to the repeater, the hop number field is updated with the value obtained by adding one (1) to the value of the hop number field of the packets and correspondence among the transmitting source address of the packets, the identifier of the port having received the packet and the value of the hop number field received as the number of hops is recorded to the transmitting port database, and when the packets received from the ports connected to the repeater is to be transmitted from the ports other than that connected to the repeater, the ring tag of the packets is deleted and the correspondence among the transmitting source address of the packets, identifier of the port having received the packets and the predetermined value as the number of hops is recorded to the transmitting port database.

4. The repeater according to claim 3, wherein:

the port supervisory control block is operable to notify, to the control block, any of the forwarding state and blocking state of two ports connected to an immediately adjacent node;

the control block periodically is operable to output, to the control packet processing block, an instruction to transmit the management packet having a ring node number field and a hop number field setting the initial value when the port in the blocking state exists; and the control packet processing block is operable to notify, when the port in the blocking state exists, the value of the hop number field of the management packet to the control block as the number of ring nodes upon reception of the management packet and also transmits the management packet setting the number of ring nodes to the ring node number field in the timing of the next transmission and to notify, when the port in the blocking state does not exist, the value in the ring node number field of the management packet to the control block upon reception of the management packet and updates the hop number field with a value attained by adding one (1) to the value of the hop number field and then transfers the value to the repeater in the next stage.

5. The repeater according to claim 3, wherein:

the port supervisory control block is operable to detect recovery from the communication fault to the adjacent repeater and notifies recovery to the control block; and the control block is operable to output, upon reception of a notice for recovery from communication fault, the instruction to set the port recovered from the fault to the blocking state to the port supervisory control block and also outputs, when the port is previously designated, the instruction to set the port to the forwarding state after passage of the predetermined period to the port supervisory control block.

6. A packet transfer method in a repeater having a plurality of ports for transmitting and receiving packets to form a ring type network, comprising the steps of:

converting the packets, when the packets received from the ports other than that connected to the adjacent repeaters are to be transmitted from the ports connected to the adjacent repeaters, into the packets to which a ring tag including the hop number field setting the initial value and then transmitting these packets to the ports connected to the adjacent repeaters;

recording, to the transmitting port database, the correspondence among the transmitting source address of the packets, identifiers of the ports having received the packets, and the predetermined value as the number of hops indicating the number of repeaters used to transfer the packets to the outside of the ring type network;

recording, upon reception of the packets to which the ring tags are added, the correspondence among the transmitting source address of the packets, port identifiers of the ports having received the packets, and the value of the hop number field of the packets to the transmitting port database and then transmitting the packets having updated the hop number field with the value obtained by adding one (1) to the value of the hop number field of the packets from the output port determined in accordance with the transmitting port database;

extracting, upon reception of the fault notifying packet transmitted from the repeater having detected the fault, the number of hops in the fault section indicating the number of repeaters used to transfer the packet to the repeater having received the fault notifying packet from the fault section; and updating the port identifier of the transmitting port database and the corresponding number of hops on the basis of the identifier of the port having received the fault notifying packet, the number of hops corresponding to the port identifier of the transmitting port database and the extracted number of hops in the fault section.

7. The packet transfer method according to claim 6, further comprising the steps of:

updating the port identifier of the entry having the identifier of the port having detected a fault among the transmitting port database to the identifier of the port connected to the other adjacent repeater upon reception of the fault of one adjacent repeater and then updating the corresponding number of hops to the value obtained by subtracting the number of hops which are written at present from the total number of repeaters;

transmitting the fault notifying packet setting the initial value as the number of hops in the fault section; and transferring, upon detection of the fault notifying packet, the value obtained by adding one (1) to the number of hops in the fault section as the new number of hops in the fault section to the repeater of the next stage.

* * * * *

UNITED STATES PATENT AND TRADEMARK OFFICE
CERTIFICATE OF CORRECTION

| | |
|---|---|
| PATENT NO. | : 7,636,299 B2 |
| APPLICATION NO. | : 11/235576 |
| DATED | : December 22, 2009 |
| INVENTOR(S) | : Akihiro Asa et al. |

Page 1 of 1

It is certified that error appears in the above-identified patent and that said Letters Patent is hereby corrected as shown below:

Column 20, Lines 21-22, change "adiacent" to --adjacent--.

Column 20, Line 50, after "exist" insert --,--.

Signed and Sealed this

Thirtieth Day of March, 2010

David J. Kappos
*Director of the United States Patent and Trademark Office*